United States Patent [19]

Sakamoto et al.

[11] Patent Number: 4,742,807

[45] Date of Patent: May 10, 1988

[54] ELECTRONIC CONTROL DEVICE FOR INTERNAL COMBUSTION ENGINE

[75] Inventors: Masahide Sakamoto, Katsuta; Seiji Suda, Mito; Takeshi Atago; Masami Nagano, both of Katsuta, all of Japan

[73] Assignee: Hitachi, Ltd., Tokyo, Japan

[21] Appl. No.: 893,376

[22] Filed: Aug. 5, 1986

[30] Foreign Application Priority Data

Aug. 5, 1985 [JP] Japan .................................. 60-171167

[51] Int. Cl.⁴ ............................................. F02D 41/16
[52] U.S. Cl. ...................................... 123/339; 123/585
[58] Field of Search ................ 123/339, 585, 349, 350, 123/352

[56] References Cited

U.S. PATENT DOCUMENTS

| 4,438,744 | 3/1984 | Hasagawa | 123/585 |
| 4,462,360 | 7/1984 | Kobayashi et al. | 123/339 |
| 4,508,076 | 4/1985 | Oda et al. | 123/339 |
| 4,513,710 | 4/1985 | Kobayashi et al. | 123/339 |
| 4,602,601 | 7/1986 | Kanai | 123/339 |
| 4,638,778 | 1/1987 | Kamai et al. | 123/339 |
| 4,653,449 | 3/1987 | Kamai et al. | 123/339 |

Primary Examiner—Raymond A. Nelli
Attorney, Agent, or Firm—Antonelli, Terry & Wands

[57] ABSTRACT

An electronic control device for an internal combustion engine provides feedback control of the idle speed using as a reference value an intake air flow rate set in correspondence with the reference value of the idle speed.

11 Claims, 4 Drawing Sheets

ELECTRONIC CONTROL DEVICE FOR INTERNAL COMBUSTION ENGINE

FIELD OF THE INVENTION

The present invention relates to the idle speed control of an internal combustion engine, and more particularly to a control device well-suited for the idle speed control of an internal combustion engine for automobiles.

BACKGROUND OF THE INVENTION

In automobile gasoline engines etc., so-called idle speed control devices (also termed 'ISC devices') for automatically controlling idle speeds to predetermined values are adopted for the purposes of the reduction of fuel costs, etc. in the mode of idling.

As described in, for example, the official gazette of Japanese Patent Application Laid-Open No. 57-195831 entitled "Idle speed control device," laid open on Dec. 1, 1982, the prior-art ISC devices are based on the feedback control with a control target value being the reference value of an idle speed in which the actual revolution speed of an engine in the idling mode is compared with the preset reference value of the idle speed so as to control the flow rate of intake air in accordance with the error between them. This feedback control has led to the disadvantage that, at the time of rapid deceleration of the engine in, e.g., the case where an accelerator pedal is suddenly returned, hunting is prone to occur, so a satisfactory controllability is not attained.

SUMMARY OF THE INVENTION

An object of the present invention is to provide an electronic control device for an internal combustion engine which exhibits a good follow-up property at the rapid deceleration of the engine, and by which an idle speed control is attained without the fear of hunting and with a satisfactory controllability.

The present invention is characterized in that a control target in the case of the feedback control of an idle speed is based on the flow rate of intake air which is previously set at a predetermined value in correspondence with the reference value of the idle speed.

DETAILED DESCRIPTION OF THE PREFERRED EMBODIMENTS

Figure 2:
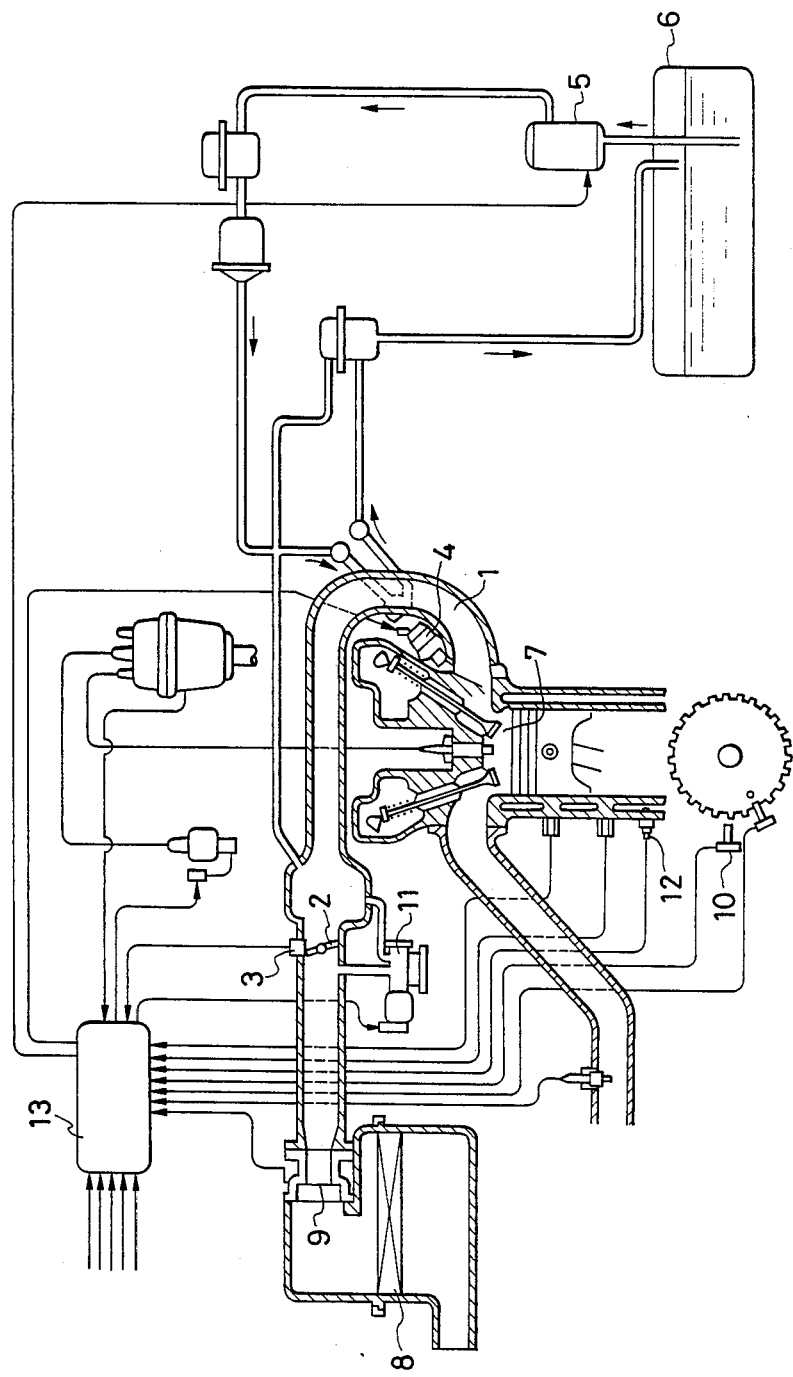
FIG. 2 is an explanatory view showing an engine system to which one embodiment of the present invention is applied.

Referring to FIG. 2, numeral 1 designates an intake pipe, numeral 2 a throttle valve, numeral 3 an idle switch, numeral 4 an injector (a fuel injection valve), numeral 5 a fuel pump, numeral 6 a fuel tank, numeral 7 a combustion chamber in a cylinder, numeral 8 an air cleaner, numeral 9 an airflow meter (an intake air flow rate sensor), numeral 10 a revolution speed sensor, numeral 11 an ISC valve (an idle speed control valve), numeral 12 a cooling water temperature sensor, and numeral 13 a control unit.

Intake air for the engine is supplied from the air cleaner 8 through the intake pipe 1 into the combustion chamber 7. The flow rate of the intake air on this occasion is regulated by the throttle valve 2, and is measured by the airflow meter 9.

On the other hand, fuel is injected into the intake pipe 1 by the injector 4 so as to produce a fuel-air mixture. At this time, the supply of the fuel to the injector 4 is performed from the fuel tank 6 by the fuel pump 5.

The ISC valve 11 is a kind of magnetic valve which is bypasses the throttle valve 2, and which is opened by an electric signal to form a passage for intake air bypassing the throttle valve 2.

The control unit 13 is furnished with a microcomputer. It receives signals from the idle switch 3, the airflow meter 9, the speed sensor 10, the cooling water temperature sensor 12, etc. and delivers control signals to the injector 4, the fuel pump 5, ignition coils, etc., to control the supply of fuel to the engine, an air-fuel ratio, ignition etc. and also to execute the processing of flow charts shown in FIGS. 1A and 1B and to feed the ISC valve 11 with a control signal $ISC_{ON}$, with which an idle speed control is carried out.

Figure 1A:
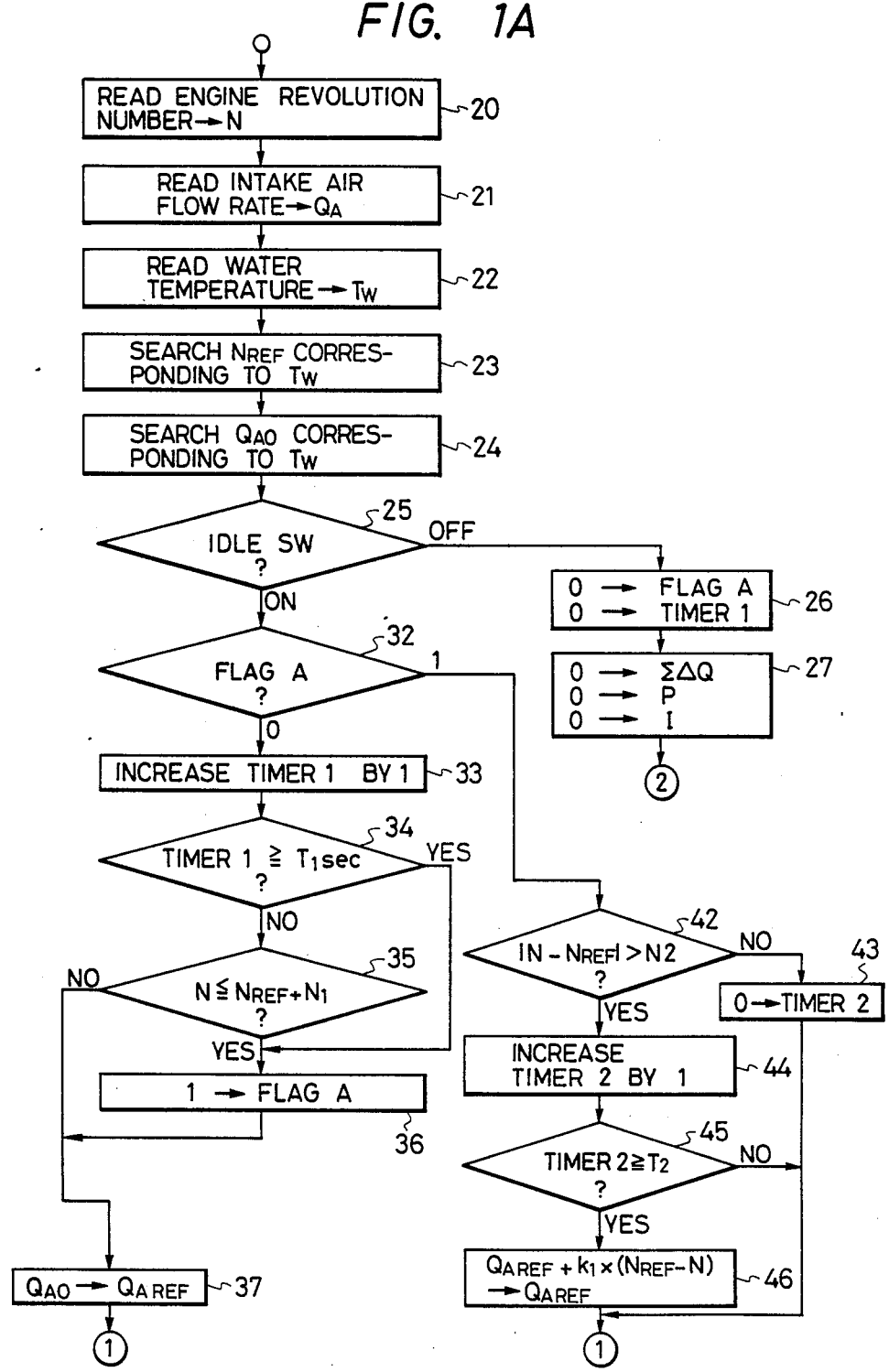
FIGS. 1A and 1B are flow charts for explaining the operation of one embodiment of an electronic control device for an internal combustion engine according to the present invention.
Figure 1B:
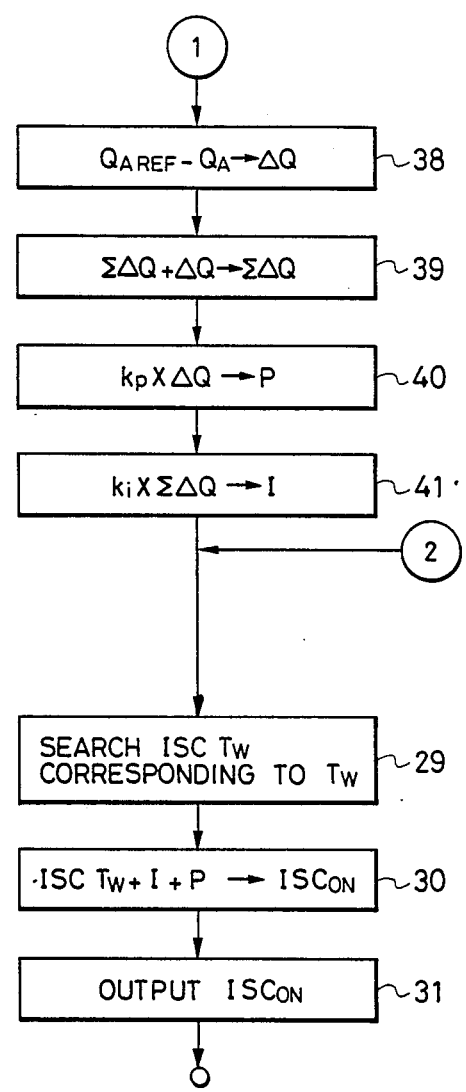

The ISC processing shown in FIGS. 1A and 1B is executed every predetermined period, for example, 10 milliseconds. Now, operations will be described in conjunction with the flow charts.

When the execution of the ISC processing has been started, an engine revolution number N and an intake air flow rate $Q_A$ are first received from the speed sensor 10 and the airflow meter 9 at S20 (S signifying 'step') and S21 respectively. At S22, a water temperature $T_W$ is read with the cooling water temperature sensor 12. A step S23 searches for the reference value $N_{REF}$ of the revolution number corresponding to the water temperature $T_W$. A step S24 searches for the reference value $Q_{AO}$ of the air flow rate corresponding to the water temperature $T_W$. At the next step S25, the signal of the idle switch 3 is examined to decide whether or not the engine has been controlled into an idling state.

When the result of the step S25 is 'idle switch OFF,' that is, when it has been decided that the engine has not been controlled into the idling state, steps S26 and S27 are executed to clear a flag A and a timer 1, and data items $\Sigma \Delta Q$, P and I respectively. Here, the data $\Sigma \Delta Q$ expresses the integrated value of the errors $\Delta Q$ between the values of the intake air flow rate $Q_A$ and the reference value $Q_{AREF}$ thereof, and the data items P and I express well-known proportional and integral components having been employed in feedback controls. The flag A and the timer 1 will become apparent later.

After the processing steps S26 and S27 have thus ended, the control flow proceeds to a processing step S29. At the step S29, this value $T_W$ is used for a table search so as to find a basic control value ISC $T_W$. At S30, the integral component I and the proportional component P are added to this value ISC $T_W$ so as to obtain the control signal ISC ON of the ISC valve 11. This signal is output to the ISC valve 11 as the processing of a step S31. In this case, the processing of the step S27 has been gone through, and hence, both the data items I and P are zero. At this time, accordingly, the control signal $ISC_{ON}$ is equal to the basic control value $ISC\ T_W$.

Figure 3:
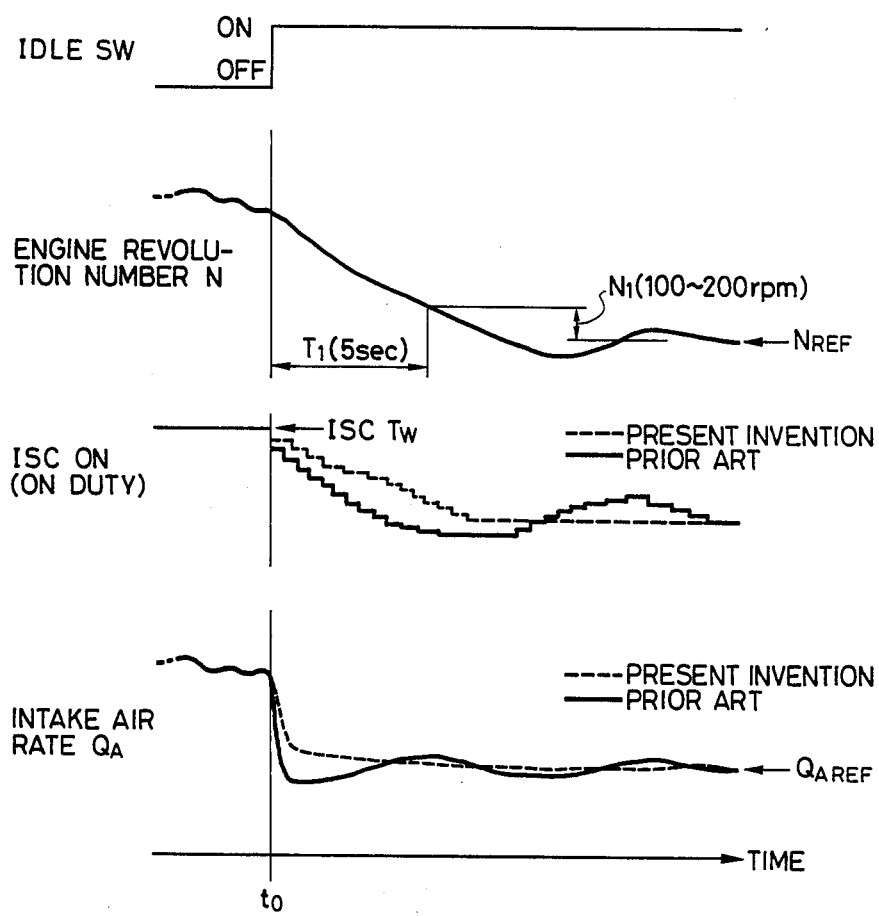
FIG. 3 is an explanatory diagram for comparing a prior-art example and the device of the present invention as to the convergences of the intake air flow rate and the engine revolution number in the idling mode.

Operations in this situation are illustrated by a time chart in FIG. 3. Since the idle switch 3 is OFF on this occasion, the engine system is in a state before a time $t_0$ in FIG. 3, and the signal ISC ON of the ISC valve 11 is held at the basic control value $ISC\ T_W$ given on the basis of the cooling water temperature $T_W$. Thus, the degree of opening of the intake air passage bypassing the throttle valve 2 has a magnitude corresponding to this signal ISC ON.

On this occasion, the idle switch 3 is OFF, that is, the throttle valve 2 is open. After all, therefore, the intake air flow rate $Q_A$, in turn, the engine revolution number N is controlled by the degree of opening of the throttle valve 2.

Next, it is assumed that the time $t_0$ has been reached at which the accelerator pedal is entirely restored to bring the throttle valve 2 to the fully closed position thereof.

Then, when the processing of FIGS. 1A and 1B has begun at the subsequent timing, the result of the step S25 becomes ON this time.

In this case, the control flow proceeds to a step S32, at which the flag A is examined. Since, on this occasion, the step S26 has just been executed, the result of decision at this step S32 naturally becomes 0. On this occasion, accordingly, the timer 1 is incremented by 1 at S33. The next stop S34 examines whether or not the timer 1 has reached $T_1$ seconds, and the result thereof becomes NO (because a value near 5 seconds is selected as the time interval $T_1$), so that this step is followed by a step S35.

The step S35 examines whether or not the revolution number N of the engine has come close to the reference value $N_{REF}$ of the idle speed within a predetermined error $N_1$ of the revolution number. As the error $N_1$ in this case, a value of 100-200 (rpm) is selected. When the result of the step S35 is NO, the control flow skips S36 and proceeds to S37.

On the other hand, when the result of the step S34 or S35 is YES, the control flow proceeds to the step S37 after the flag A is set at the step S36.

At the step S37, the preset standard value $Q_{AO}$ of the intake air flow rate is set as the reference value $Q_{AREF}$ of the intake air flow rate. Subsequently, a step S38 evaluates the error $\Delta Q$ between the reference value $Q_{AREF}$ and the actual value $Q_A$ of the intake air flow rate, and a step S39 adds this new error $\Delta Q$ to the value of the errors $\Delta Q$ successively integrated till then. Thereafter, at S40, the proportional component P is evaluated by multiplying the error $\Delta Q$ by a predetermined coefficient $k_p$, and at a step S41, the integral component I is evaluated by multiplying $\Sigma \Delta Q$ by a predetermined coefficient $k_i$.

In this situation, accordingly, the signal ISC ON to be output later at the step S31 becomes a value with this proportional component P and this integral component I added thereto. Here, the feedback control of the intake air flow rate $Q_A$ in which the reference value $Q_{AREF}$ of the intake air flow rate is a control target value is attained for the first time. As a result, the duty of the control signal ISC ON for the ISC valve 11 lowers by every (P+I) from the value $ISC\ T_W$ in succession since the time $t_0$ in FIG. 3. Accordingly, the intake air flow rate $Q_A$ converges to the reference value $Q_{AREF}$, and also the engine revolution number N converges to the reference value $N_{REF}$.

When, in this manner, the time interval $T_1$ has lapsed or the engine resolution number N has come close to the reference value $N_{REF}$ within the error $N_1$ after the time $t_0$, the step S36 is executed to set the flag A at this point of time.

After the flag A has been set, processing steps S42-S46 are executed instead of those S33-S37 this time.

First, the step S42 decides whether or not the absolute value of the error between the engine revolution number N and the reference value $N_{REF}$ is greater than a predetermined value $N_2$. When the result of the decision is NO, merely a timer 2 is cleared by executing the step S43. The predetermined value $N_2$ in this case is selected to be 50 (rpm) by way of example.

Next, when the result of the step S42 is YES, the timer 2 is incremented by 1 at the step S44. Thereafter, the step S45 examines whether or not the timer 2 has reached at least a predetermined time interval $T_2$. When the result of the decision is NO, the step S46 is skipped. The predetermined time interval $T_2$ is selected to 1 second by way of example.

When the result of the step S46 has become YES, the step S46 is executed at which the error $(N_{REF}-N)$ between the reference value $N_{REF}$ and actual value N of the engine revolution number as multiplied by a predetermined coefficient $k_1$ is added to the reference value $Q_{AREF}$ of the intake air flow rate used till then, thereby to prepare a new reference value $Q_{AREF}$. In contrast, when this step S46 is not gone through, either the reference value ($Q_{AO}=Q_{AREF}$) already set at the step S37 or a reference value set at the step S46 before is left as $Q_{AREF}$ without any change, whereupon the control flow proceeds to the step S38.

Figure 4:
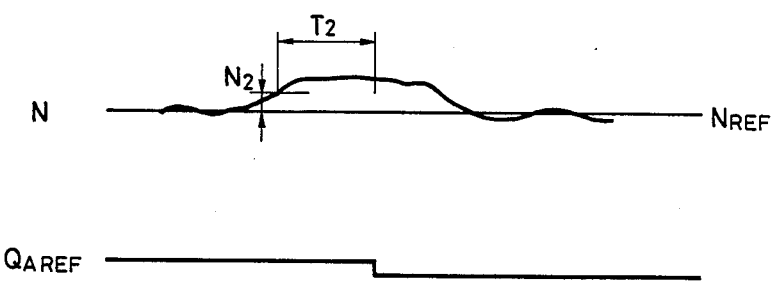
FIG. 4 is a diagram for explaining the function of correcting the reference value of the air flow rate in one aspect of performance of the present invention.

Accordingly, in the case where the control flow has proceeded from the step S32 to the step S42, the situation of the control is as illustrated in FIG. 4. That is, whether or not the engine revolution number N lies within a range less than the predetermined value $N_2$ relative to the reference value $N_{REF}$ is examined, and when the number N has continued to exceed the range for at least the time interval $T_2$, the reference value $Q_{AREF}$ of the intake air flow rate is corrected by a magnitude corresponding to the error between the engine revolution number N and the reference value $N_{REF}$. As the reference value $N_{REF}$ of the idle speed, a value of 650 (rpm) is selected by way of example.

The operations resulting from the repetition of the processing in FIGS. 1A and 1B will be summed up:

(1) When the accelerator pedal is restored to bring the engine into the idling state, the result of the step S25 becomes ON, and consequently, the steps S38 to S41 and the steps S28 to S31 are executed without fail. Therefore, the feedback control of the intake air flow rate $Q_A$ in which the control target value is the reference value $Q_{AREF}$ of the intake air flow rate is attained as illustrated after the time $t_0$ in FIG. 3, and the control in which the engine revolution number N converges on the idle speed reference value $N_{REF}$ is attained.

(2) For a while after the idling state has been established, the reference value $Q_{AREF}$ of the intake air flow rate is put by the processing of the step S37 to the standard value $Q_{AO}$ which has been previously set in correspondence with the reference value $N_{REF}$ of the idle speed, and this standard value serves as the control target value of the intake air flow rate $Q_A$. However, when the time interval $T_1$ lapses or the engine revolution number N approaches the reference value $N_{REF}$ within the predetermined value $N_1$ owing to the processing of the steps S33 to S36, the function of correcting the reference value $Q_{AREF}$ of the intake air flow rate as illustrated in FIG. 4 is fulfilled owing to the steps S42 to S46. Thus, even in a case where the relation of the reference value $Q_{AREF}$ of the intake air flow rate to the reference value $N_{REF}$ of the idle speed has altered due to a change in the idle running condition of the engine, for example, a change in the driving condition of an auxiliary machine, the control which holds the engine revolution number N precisely at the reference value $N_{REF}$ is always attained.

Although, in the foregoing embodiment, the reference value $N_{REF}$ of the idle speed is fixed, it may well be varied according to the running conditions of the engine.

By way of example, when this reference value $N_{REF}$ is given as a function of the cooling water temperature of the engine, a FISC (fast idle speed control) function can be afforded. Besides, when the reference value is varied according to the turn-on/-off of an auxiliary machine such as car cooler, an idle-up function is readily added.

It is needless to say that the present invention is applicable, not only to the engine of the fuel injection system as shown in FIG. 2, but also to an engine employing a carburettor.

As described above, according to the present invention, a control target value for the feedback control of an intake air flow rate in the mode of idling is not made the reference value of the idle speed of an engine but is made the reference value of the intake air flow rate corresponding thereto. Therefore, even in case of a rapid deceleration in shifting the engine to the idling state, the occurrence of hunting is not feared, and an excellent controllability is readily attained under a satisfactory responsiveness.

What we claim is:

1. An idle speed control system for an internal combustion engine, comprising:
    first means for setting a reference value of intake air flow rate for an idling mode of operation of the internal combustion engine;
    second means for measuring the value of air flow rate in the internal combustion engine;
    third means for detecting a difference between said air flow rate reference value and said measured value of air flow rate and for producing a control signal on the basis of said difference; and
    fourth means for controlling the intake air flow rate of said internal combustion engine according to the value of said control signal.

2. An idle speed control system according to claim 1, wherein said first means comprises:
    fifth means for measuring the speed of said internal combustion engine;
    sixth means for setting a reference value of engine speed;
    seventh means for detecting a difference between said engine speed reference value and the measured speed of the internal combustion engine and for producing a speed difference signal; and
    eighth means for setting a reference value of intake air flow rate based on said speed difference signal.

3. An idle speed control system according to claim 2, wherein said sixth means comprises means for measuring coolant temperature in the internal combustion engine and means for setting said reference value of engine speed as a function of measured coolant temperature.

4. An idle speed control system according to claim 1, wherein said first means comprises means for measuring coolant temperature in the internal combustion engine and means for setting said reference value of intake air flow rate as a function of measured coolant temperature.

5. A method of operation of an internal combustion engine for idle speed control in which said engine includes means for measuring the temperature of coolant in the engine, an air intake pipe having a throttle valve mounted therein, an idle switch mounted to detect when said throttle valve is in an idling position, an air flow meter for measuring air flow rate in said air intake pipe, a secondary air flow passage connected to said air intake pipe to by-pass said throttle valve, and an idle speed control valve mounted in said secondary air flow passage, the method comprising the steps of:
    (a) setting a reference value of air flow rate for an idling mode of operation of said engine;
    (b) detecting a difference between said reference value of air flow rate and a measure value of air flow rate provided by said air flow meter;
    (c) producing an idle speed control signal based at least in part on the air flow rate difference detected in step (b); and
    (d) controlling said idle speed control valve on the basis of said idle speed control signal.

6. A method according to claim 5, wherein said step (a) comprises storing a plurality of reference values of an air flow rate versus respective values of coolant temperature, and selecting a reference value of air flow rate from said stored plurality of reference values on the basis of the coolant temperature indicated by said temperature measuring means.

7. A method according to claim 6, wherein said step (a) further comprises detecting from the output of said idle switch when said throttle valve reaches an idling position, detecting a first point in time when a predetermined first time has elapsed or the speed of the engine falls below a value equal to a reference speed added to a predetermined first speed following the time the throttle valve reaches said idling position, detecting the difference between the speed of the engine and said reference speed and comparing said detected difference to a predetermined second speed after said first point in time has been reached to determine when said detected difference exceeds said predetermined second speed, and adjusting the value of said selected reference value of air flow rate according to said detected difference between the speed of the engine and said reference speed.

8. A method according to claim 5, wherein said step (a) comprises measuring the speed of the internal combustion engine, setting a reference value of said engine speed, detecting a difference between said engine speed reference value and said measured speed and producing a speed difference signal corresponding to the detected difference, and determining a value of air flow rate on the basis of the value of said speed difference signal.

9. A method according to claim 8, wherein the setting of the reference value of engine speed is effected by determining the temperature of the coolant in the engine from said measuring means and setting said reference value of engine speed as a function of measured coolant temperature.

10. A method according to claim 5, wherein said step (c) comprises storing respective base values of idle speed control versus values of coolant temperature, selecting a base value of idle speed control on the basis of the coolant temperature indicated by said measuring means, and adjusting said selected base value with proportional and integral correction components to produce said idle speed control signal.

11. A method according to claim 10, wherein said proportional and integral correction components are determined on the basis of the detected difference between said reference value of air flow rate and the measured value of air flow rate provided by said air flow meter.

* * * * *